US012499845B2

(12) United States Patent
Oh et al.

(10) Patent No.: US 12,499,845 B2
(45) Date of Patent: Dec. 16, 2025

(54) SOURCE DRIVER FOR OUTPUTTING BLACK GRAYSCALE VOLTAGE SELECTED DEPENDING ON VOLTAGE OF PIN AND CONTROL METHOD THEREOF

(71) Applicant: LX SEMICON CO., LTD., Daejeon (KR)

(72) Inventors: Jun Young Oh, Daejeon (KR); Min Young Jeong, Daejeon (KR); Yong Woo Choi, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/760,643

(22) Filed: Jul. 1, 2024

(65) Prior Publication Data

US 2025/0022426 A1 Jan. 16, 2025

(30) Foreign Application Priority Data

Jul. 11, 2023 (KR) ........................ 10-2023-0090059
Apr. 16, 2024 (KR) ........................ 10-2024-0050746

(51) Int. Cl.
*G09G 3/3275* (2016.01)
*G09G 3/20* (2006.01)
*G09G 3/3233* (2016.01)

(52) U.S. Cl.
CPC ......... *G09G 3/3275* (2013.01); *G09G 3/2007* (2013.01); *G09G 3/3233* (2013.01); *G09G 2300/0842* (2013.01); *G09G 2310/027* (2013.01); *G09G 2310/0291* (2013.01); *G09G 2310/0297* (2013.01); *G09G 2320/02* (2013.01); *G09G 2330/021* (2013.01); *G09G 2330/028* (2013.01)

(58) Field of Classification Search
CPC .................................................... G09G 3/3275
USPC .......................................................... 345/690
See application file for complete search history.

(56) References Cited

U.S. PATENT DOCUMENTS

2009/0040244 A1 2/2009 Lee et al.
2015/0243204 A1* 8/2015 Park ..................... G09G 3/3688 345/212
2016/0232867 A1* 8/2016 Iwasaki ................ G09G 3/3648
2023/0119029 A1 4/2023 Oh et al.
2024/0212572 A1* 6/2024 Hong .................. G09G 3/3275

OTHER PUBLICATIONS

Extended European Search Report dated Nov. 13, 2024 issued in Patent Application No. EP 24182316.0 (13 pages).

* cited by examiner

*Primary Examiner* — Long D Pham
(74) *Attorney, Agent, or Firm* — POLSINELLI PC

(57) ABSTRACT

A source driver includes a pin to which a first voltage or a second voltage is applied; an output multiplexer configured to select a data voltage and a black grayscale voltage of pixel data; and a controller configured to control a voltage level of the black grayscale voltage differently depending on the voltage applied to the pin.

18 Claims, 12 Drawing Sheets

FIG. 10

<table>
<tr><th></th><th>PN</th><th>CHMUX</th><th>VDDEN</th><th>VSSEN</th><th>Source Driver Output</th></tr>
<tr><td>Normal Driving Period</td><td>L or H</td><td>ON</td><td>OFF</td><td>OFF</td><td>Vdata</td></tr>
<tr><td>Power On Period</td><td rowspan="4">L</td><td rowspan="8">OFF</td><td rowspan="4">ON</td><td rowspan="4">OFF</td><td rowspan="4">High Potential Voltage (VDD)</td></tr>
<tr><td>Power Off Period</td></tr>
<tr><td>Low Power Driving Period</td></tr>
<tr><td>Abnormal Driving Period</td></tr>
<tr><td>Power On Period</td><td rowspan="4">H</td><td rowspan="4">OFF</td><td rowspan="4">ON</td><td rowspan="4">Low Potential Voltage (VSS)</td></tr>
<tr><td>Power Off Period</td></tr>
<tr><td>Low Power Driving Period</td></tr>
<tr><td>Abnormal Driving Period</td></tr>
</table>

FIG. 11A

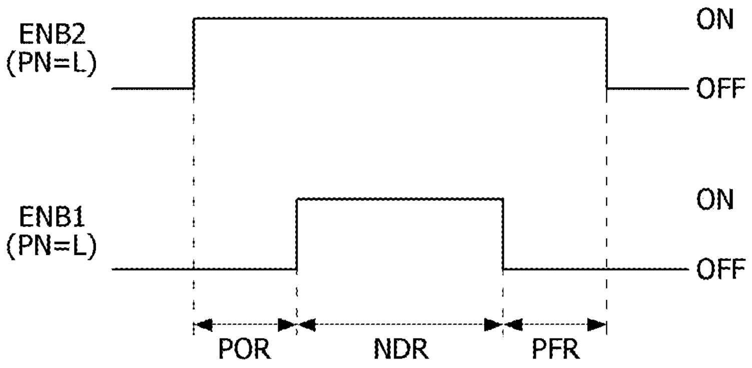

SOURCE DRIVER FOR OUTPUTTING BLACK GRAYSCALE VOLTAGE SELECTED DEPENDING ON VOLTAGE OF PIN AND CONTROL METHOD THEREOF

CROSS-REFERENCE TO RELATED APPLICATION

This application claims the priorities of Korean Patent Application No. 10-2023-0090059, filed Jul. 11, 2023 and Korean Patent Application No. 10-2024-0050746, filed on Apr. 16, 2024, which are hereby incorporated by reference in their entirety.

BACKGROUND

Field of the Disclosure

The present disclosure relates to a source driver and a control method thereof.

Description of the Background

A variety of display devices are known, including electroluminescence displays (ELD) such as liquid crystal displays (LCD) and organic light-emitting diode displays (OLED displays), field emission displays (FED), plasma display panels (PDP), and electrophoresis displays (EPD).

A display device includes a display panel having pixels arranged to display an input image, and a display panel driving circuit that writes data to the pixels of the display panel. The display panel driving circuit may include a source driver in which a data driving circuit for supplying data signals to data lines of the display panel is integrated.

An output voltage from the source driver may vary according to driving characteristics of the display panel, for example, semiconductor channel characteristics of the transistors that constitute pixel circuits. For example, a pixel circuit of an OLED display may include a driving transistor that supplies current to the OLED. The driving transistor may be implemented as an n-channel transistor or a p-channel transistor. Since the voltage of the same grayscale varies depending on the channel type of the driving transistor, the source driver is developed separately depending on the transistor type of the display panel.

SUMMARY

Accordingly, the present disclosure is to provide a source driver capable of changing an output voltage according to driving characteristics of a display panel, and a control method thereof.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a source driver includes a pin to which a first voltage or a second voltage is applied; an output multiplexer configured to select a data voltage and a black grayscale voltage of pixel data; and a controller configured to control a voltage level of the black grayscale voltage differently depending on the voltage applied to the pin.

The black grayscale voltage may be higher than a white grayscale voltage when the voltage on the pin is the first voltage. The black-grayscale voltage may be lower than the white-grayscale voltage when the voltage on the pin is the second voltage.

The source driver may further include a digital-to-analog converter configured to convert an input digital signal to a grayscale voltage; a gamma voltage generator configured to supply the grayscale voltage to the digital-to-analog converter; and an output buffer connected to an output terminal of the digital-to-analog converter.

The output multiplexer may select one of an output voltage from the output buffer, a high potential voltage, and a low potential voltage lower than the high potential voltage under the control of the controller and output it.

The output multiplexer may select and out the output voltage of the output buffer to an output terminal of the source driver during a normal driving period in which pixel data of an input image is received.

The output multiplexer may select and output the high potential voltage to the output terminal of the source driver when the voltage on the pin is the first voltage in at least one of a power-on period, a power-off period, an abnormal driving period, and a low power driving period. The output multiplexer may select and output the low potential voltage to the output terminal of the source driver when the voltage on the pin is the second voltage in at least one of the power-on period, the power-off period, the abnormal driving period, and the low power driving period.

The gamma voltage generator may include a first buffer configured to output the lowest reference voltage; and a second buffer configured to output the highest reference voltage. The second buffer may be turned on and the first buffer may be in the off state when the voltage on the pin is the first voltage during the power-on period. The first buffer may be turned on and the second buffer may be in the off state when the voltage on the pin is the second voltage during the power-on period.

The pin may be connected to any one of a power wire disposed on a printed circuit board, a power wire disposed on a film on which the source driver is mounted, and a power wire disposed on a display panel to which the source driver is electrically connected.

In another aspect of the present disclosure, a method of controlling the source driver includes selecting one of first and second black grayscale voltages having different voltage levels depending on a voltage level on a pin; and outputting the selected black grayscale voltage.

The selected black grayscale voltage may be higher than a white grayscale voltage when the voltage on the pin is a first voltage. The selected black-grayscale voltage may be lower than the white-grayscale voltage when the voltage on the pin is a second voltage.

The method may further include outputting a data voltage of pixel data regardless of the voltage level on the pin during a normal operating period in which pixel data of an input image is received; and outputting the selected black grayscale voltage in at least one of a power-on period, a power-off period, an abnormal driving period, and a low power driving period.

An output voltage level of the source driver may be selected during the power-on period and the power-off period according to a voltage applied to the pin.

According to aspects of the present disclosure, the source driver may select a grayscale voltage suitable for the driving characteristics of the display panel depending on a voltage level or a logic value on the pin. Therefore, the source driver of the present disclosure is compatible with the display panels having different driving characteristics.

According to aspects of the present disclosure, the source driver may prevent an abnormal image that may be visible on the display panel during power-on/off periods, an abnormal driving period, and a low power driving period.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which:

FIG. 10 is a diagram illustrating the operation of the output multiplexer;

FIGS. 11A and 11B are diagrams illustrating a method of controlling buffers in the gamma voltage generator according to one aspect of the present disclosure;

DETAILED DESCRIPTION

Figure 1:
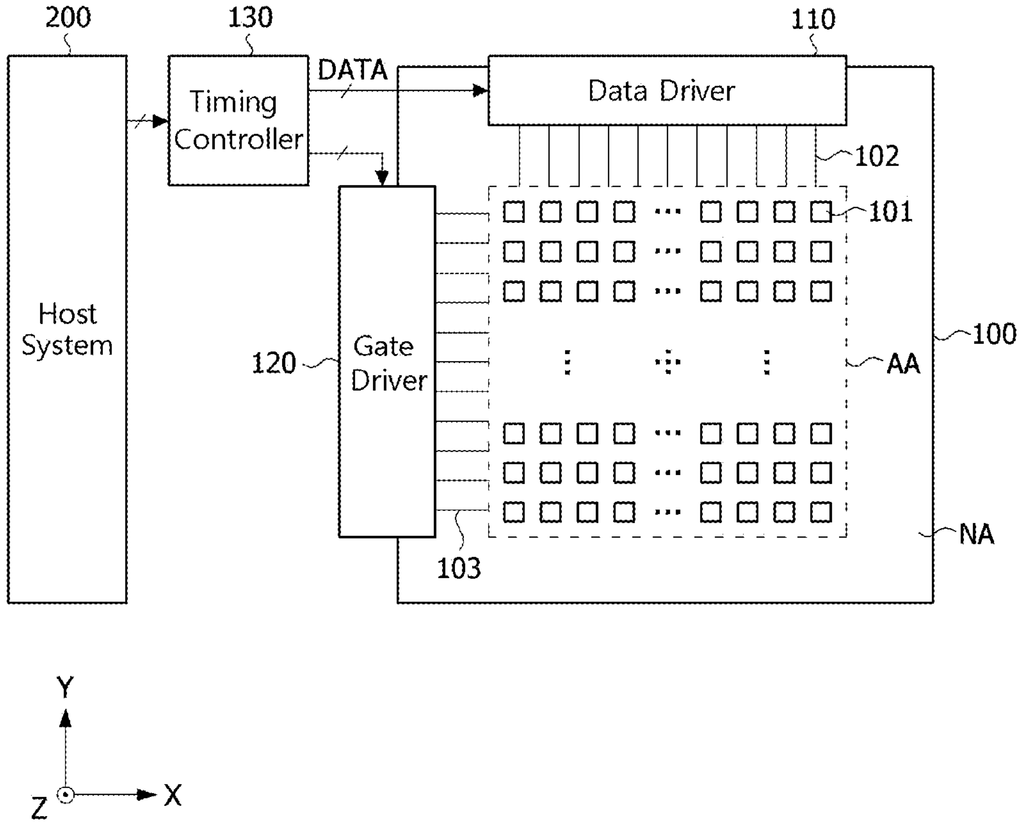
FIG. 1 is a block diagram illustrating a display device according to one aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following aspects may be partially or entirely bonded to or combined with each other and may be linked and operated in technically various ways. The aspects may be carried out independently of or in association with each other.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor, since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. In the following description, a source and a drain of a transistor will be referred to as a first electrode and a second electrode.

The transistor may be implemented as an oxide TFT (thin film transistor) including an oxide semiconductor, or an LTPS (low temperature poly silicon) TFT including a poly silicon, and the like.

In the following, a first type of panel and a second type of panel refer to a display panel that has different grayscale voltages due to differences in the driving characteristics of the display panel. For example, the first type of panel may be a display panel in which a driving transistor for driving a light-emitting element such as an OLED is implemented as a p-channel transistor, among electroluminescent display devices. In another example, the first type of panel may be a liquid crystal display panel in a normally white mode, among display panels of liquid crystal display devices. In a source driver for driving the data lines of the first type of panel, a black grayscale voltage may be a voltage higher than a white grayscale voltage.

The second type of panel may be a display panel in which a driving transistor for driving a light-emitting element is implemented as a p-channel transistor, among the display panels of the electroluminescent display devices. In another example, the second type of panel may be a liquid crystal display panel in a normally black mode, among display panels of liquid crystal display devices. In a source driver for driving the data lines of the second type of panel, a black grayscale voltage may be a voltage lower than a white grayscale voltage.

The source driver of the present disclosure includes a pin that indicate the driving characteristics of a display panel 100. The pin may be a single pin. The pin may be exposed outside an IC chip of the source driver. A voltage level applied to the pin may determine a logic value that indicates the driving characteristics of the display panel 100. The source driver may compatibly drive the data lines of the display panel having different driving characteristics by selecting the grayscale voltage dictated by the logic value on the pin, and may also avoid an abnormal image that may be visible on the display panel during a power-on/off period, an abnormal driving period, and a low power driving period.

The abnormal driving period may include a period in which static electricity, overcurrent, overvoltage, and the like are detected. The low power driving period may be activated in a period in which at least one of a host system 200, a timing controller 130, and a data driver 110 does not output a signal to reduce power consumption, for example, in a period in which a still image lasts for a predetermined period of time period, a standby mode, or a vertical blank period in which pixel data is not present between an (N)th (N being a natural number) frame and an (N+1)th frame, thereby reducing power consumption of the display device.

Hereinafter, various aspects of the present disclosure will be described in detail with reference to the accompanying drawings.

FIG. 1 is a block diagram illustrating a display device according to one aspect of the present disclosure.

Referring to FIG. 1, a display device according to an aspect of the present disclosure includes a display panel 100 and a display panel driving circuit for writing source data to pixels of the display panel 100.

A substrate of the display panel 100 may be, but is not limited to, a plastic substrate, a thin glass substrate, or a metal substrate. The display panel 100 may be, but is not limited to, a panel having a rectangular structure with a length in a first direction (X), a width in a second direction (Y), and a thickness in a third direction (Z).

In the case of a liquid crystal display device, a backlight unit (BLU) may be disposed below the display panel 100. In the case of a self-emitting display device such as an electroluminescent display device, a separate light source such as a backlight unit is not required.

A display area AA of the display panel 100 includes a pixel array for displaying an input image thereon. The pixel array includes a plurality of data lines 102, a plurality of gate lines 103 intersecting the data lines 102, and the pixels 101 connected to the data lines 102 and the gate lines 103.

Each of the pixels 101 may be divided into a red sub-pixel, a green sub-pixel, and a blue sub-pixel for color implementation. Each of the pixels may further include a white sub-pixel. In a liquid crystal display device, the pixels include liquid crystal cells. In electroluminescent display devices, the pixels may include light-emitting elements such as OLEDs. Each of the sub-pixels includes a pixel circuit for driving a liquid crystal cell or a light-emitting element.

The display panel driving circuit writes pixel data (or source data) of an input image to the pixels of the display panel 100 under the control of a timing controller 130. The display panel driving circuit includes a data driver 110 that converts the pixel data to a data voltage, and a gate driver 120.

The display panel driving circuit may further include a touch sensor driver for driving touch sensors. The touch sensor driver is omitted from FIG. 1. The data driver 110 and the touch sensor driver may be integrated together into a source driver integrated circuit (IC). In the following, a source driver may be interpreted as the source driver IC.

The data driver 110 receives the pixel data of the input image received as a digital signal from the timing controller 130 and outputs the data voltage. The data driver 110 may convert the input digital signal to a grayscale voltage (or a gamma compensation voltage) using a digital-to-analog converter (hereinafter referred to as DAC) and output the data voltage. The data voltage of the pixel data may be output as the grayscale voltage corresponding to a grayscale value of the pixel data. For 8-bit pixel data, pixel data "0000" may be black grayscale or grayscale of 0 (zero), and "1111 1111" may be white gray scale or gray scale of 255.

For the first type of panel, the voltage level of the black grayscale may be a maximum voltage or a high potential voltage close to the maximum voltage in the range of the output voltage of the data driver 110, while the voltage level of the white grayscale may be a minimum voltage or a low potential voltage close to the minimum voltage in the range of the output voltage of the data driver 110. For the second type of panel, the voltage level of the black grayscale may be a minimum voltage or a low potential voltage close to the minimum voltage in the range of the output voltage of the data driver 110, while the voltage level of the white grayscale may be a maximum voltage or a high potential voltage close to the maximum voltage in the range of the output voltage of the data driver 110.

The data driver 110 may output the grayscale voltage suitable for the driving characteristics of the display panel 100 in response to a logic value on the pin described below. For example, the data driver 110 may output a black grayscale voltage as the high potential voltage in response to a first logic value on the pin when driving the data lines of the first type of panel. On the other hand, the data driver 110 may output a black grayscale voltage as the low potential voltage in response to a second logic value on the pin. Where the first logical value may be, but is not limited to, Low or 0 (zero) and the second logical value may be High or 1. In the following, the high potential voltage set as the black grayscale voltage in the first type of panel may be, for example, but not limited to, VDD. In the second type of panel, the low potential voltage set as the black grayscale voltage may be, for example, but not limited to, VSS.

Figure 3:
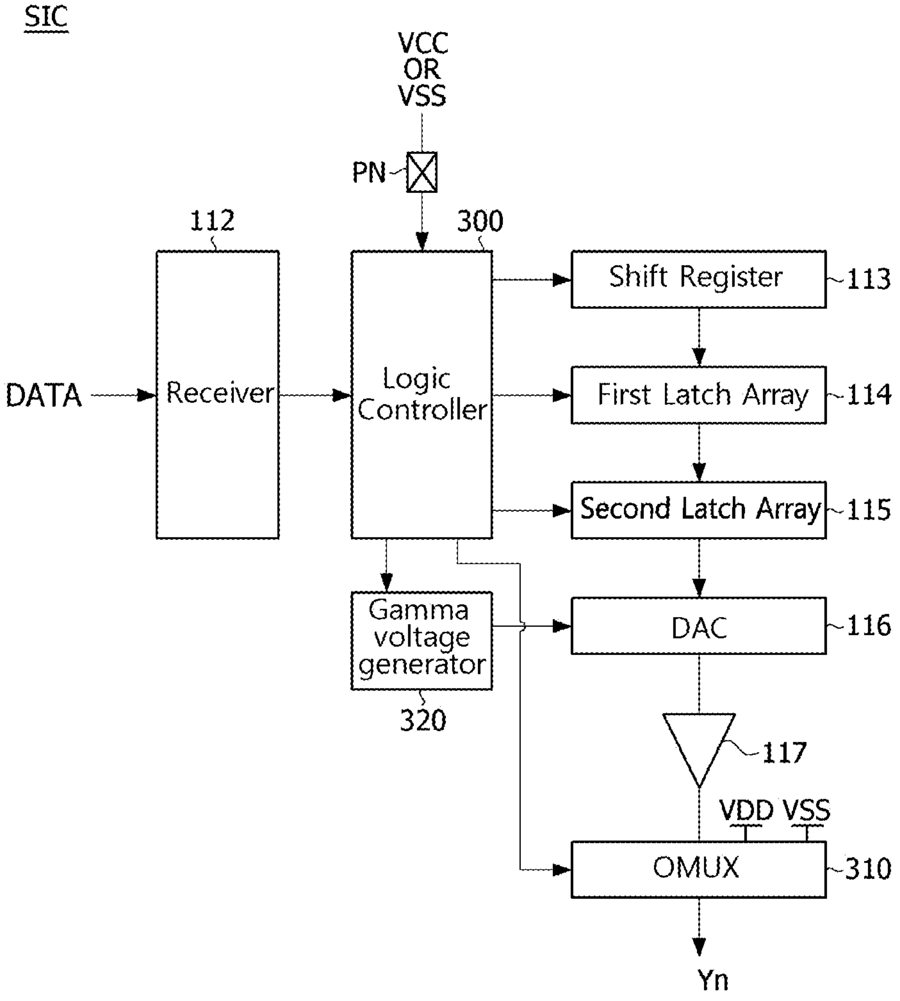
FIG. 3 is a block diagram illustrating a source driver according to one aspect of the present disclosure.

The circuit of the data driver 110 may be integrated into the source driver. The source driver may include the data driver 110 as shown in FIG. 3.

A circuit of the gate driver 120 may be disposed in the non-display area NA outside the display area AA in the display panel 100 or at least a portion thereof may be disposed in the display area AA. The gate driver 120 may be integrated into a separate gate driver IC and electrically connected to the gate lines 103 of the display panel 100.

The gate driver 120 sequentially outputs a gate pulse (or a scan pulse) to the gate lines 103 under the control of the timing controller 130. The gate driver 120 may sequentially supply the gate pulse to the gate lines 103 by shifting the gate pulse using a shift register.

The display device may further include a power supply omitted from the drawings. The power supply receives an input voltage applied from the host system 200 and outputs a constant voltage required to drive the pixels 101 of the display panel 100 and the display panel driving circuit. The constant voltage output from the power supply may include a high potential voltage VDD, an IC supply voltage VCC, a low potential voltage VSS, a first input voltage VREFL, a second input voltage VREFH, a medium reference voltage VGC, etc.

The timing controller 130 receives the pixel data of the input image and a timing signal synchronized with the pixel data from the external host system 200. The timing signal may include a vertical synchronization signal Vsync, a horizontal synchronization signal Hsync, a data enable signal DE, and a main clock. A vertical period and a horizontal period may be identified by a method of counting the data enable signal DE, and thus the vertical synchronization signal Vsync and the horizontal synchronization signal Hsync may be omitted. The vertical synchronization signal Vsync has a period of one frame period. The horizontal synchronization signal Hsync and the data enable signal DE include a period of one horizontal period (1H). The timing controller 130 may control the operation timing of the display panel driving circuit 110 and 120 based on the timing signals Vsync, Hsync, and DE received from the host system 200. The timing controller 130 may control the source driver in a power-on period by transmitting a power-on reset signal to the source driver, and may control the source driver in a low power driving period (or low power mode) by adding a low power mode enable signal to data and transmitting the same to the source driver.

The host system 200 may scale an image signal from a video source to match the resolution of the display panel 100, and may transmit it to the timing controller 130 together with the timing control signal.

Figure 2A:
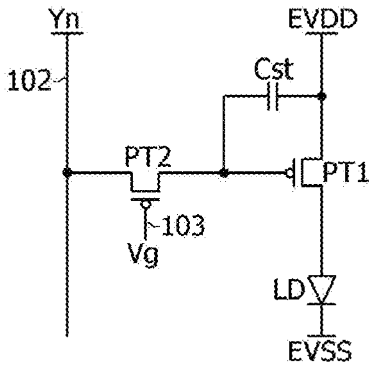
FIGS. 2A and 2B are circuit diagrams illustrating an example of a pixel circuit formed in a display panel.
Figure 2B:
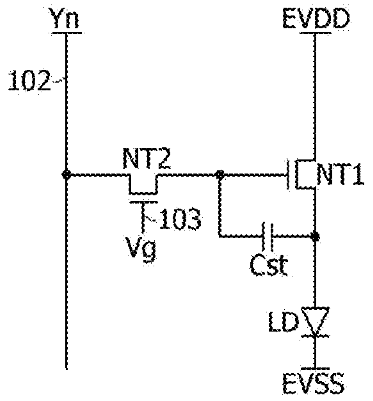

FIGS. 2A and 2B are circuit diagrams illustrating an example of a pixel circuit formed in the display panel.

Referring to FIGS. 2A and 2B, the pixel circuit includes a light-emitting element LD, driving transistors PT1 and NT1, one or more switch transistors PT2 and NT2, and a storage capacitor Cst.

The driving transistors PT1 and NT1 and the light-emitting element LD may be connected in series between an EVDD node to which the pixel driving voltage EVDD is applied and an EVSS node to which the pixel base voltage EVSS is applied. The driving transistors PT1 and NT1 may generate a current to drive the light-emitting element LD according to their gate-source voltages.

The switch transistors PT2 and NT2 may be connected between the data line 102 and gate electrodes of the driving transistors PT1 and NT1 and may be turned on in response to a gate pulse Vg input through the gate line 103. When the switch transistors PT2 and NT2 are turned on, an output voltage Yn from the data driver 110 may be applied to the gate electrodes of the driving transistors PT1 and NT1.

Although not shown in the drawings, a switch transistor may be connected between the EVDD node and the driving transistors PT1 and NT1, and another switch transistor may be connected between the driving transistors PT1 and NT1 and the EVSS node. These switch transistors may be turned on in response to another gate signal, for example, an emission signal. A compensation circuit for sensing and compensating threshold voltages of the driving transistors PT1 and NT1 may be connected to the driving transistors PT1 and NT1.

The transistors PT1 and PT2 constituting the pixel circuit shown in FIG. 2A may be a p-channel LTPS (Low-Temperature Polycrystalline Silicon) TFT (Thin Film Transistor). The transistors NT1 and NT2 constituting the pixel circuit shown in FIG. 2B may be an n-channel oxide TFT.

The sub-pixels disposed in the first type of panel may be implemented as a pixel circuit as shown in FIG. 2A. The sub-pixels disposed in the second type of panel may be implemented as a pixel circuit as shown in FIG. 2B.

FIG. 3 is a block diagram illustrating a source driver according to one aspect of the present disclosure.

Referring to FIG. 3, the data driver 110 of the source driver SIC may include a receiver 112, a logic controller 300, a shift register 113, a first latch array 114, a second latch array 115, a gamma voltage generator 320, a DAC 116, an output buffer 117, and an output multiplexer OMUX 310.

To drive the source driver SIC, the constant voltages VDD, VCC, and VSS are applied to the source driver SIC. The high potential voltage VDD may be a voltage higher than the low potential voltage VSS, and the IC power voltage VCC may be a voltage lower than the high potential voltage VDD and higher than the low potential voltage VSS. For example, VDD=9 V and VCC=1.8 V. It may be, but is not limited to, VSS=0 V.

The timing controller 130 may convert clock and data to a differential signal of a low voltage and transmit the differential signal to the data driver 110 through a high-speed serial interface. The receiver 112 receives data DATA transmitted in series from the timing controller 130. The receiver 112 restores the clock from the data DATA, samples the control data from the data using the restored clock DATA and the pixel data of the input image, and provides them to the logic controller 300.

The logic controller 300 may transmit the pixel data of the input image supplied from the receiver 112 to the shift register 113, and may control the output timings of the first and second latch arrays 114 and 115 using the restored clock and the control data. The shift register 113, the first latch array 114, and the second latch array 115 convert serial mode data to parallel mode data. The shift register 113 sequentially outputs the pixel data of the input image to the latches in the first latch array 114. The first latch array 114 sequentially samples the pixel data of the input image input through the shift register 113 in response to the clock input from the logic controller 300, and when all latches are latched, outputs the latched pixel data simultaneously to the latches in the second latch array 115. The second latch array 115 latches the pixel data simultaneously received from the latches in the first latch array 114 and simultaneously outputs the latched pixel data to the DAC 116 in response to an output enable signal from the logic controller 300.

The logic controller 300 may include a voltage detection circuit to detect the high potential voltage VDD, an over-current protection circuit, and the like.

Figure 8:
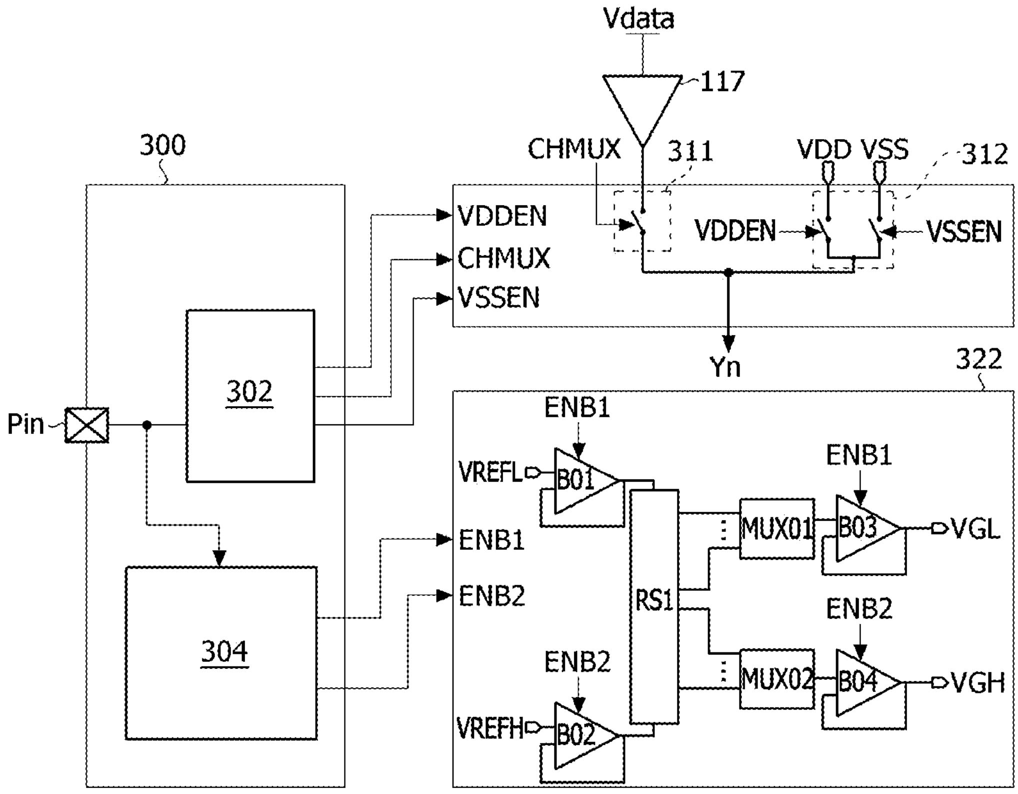
FIGS. 8 and 9 are circuit diagrams illustrating a gamma voltage generator and an output multiplexer in detail according to one aspect of the present disclosure.

The logic controller 300 may control at least one of the output multiplexer 310 and the gamma voltage generator 320 depending on the logic value on the pin PN to ensure that a black grayscale voltage suitable for the driving characteristics of the display panel 100 may be output during at least one of a power-on period, a power-off period, an abnormal driving period, and a low-power driving period (or low-power mode). To this end, the logic controller 300 further includes a first controller 302 and a second controller 304, as shown in FIG. 8.

The gamma voltage generator 320 supplies gamma reference voltages having different voltage levels to the DAC 116. The gamma voltage generator 320 may be implemented as a programmable gamma voltage generation circuit that may adjust the voltage level of each of the gamma reference voltages depending on a register setting value. The gamma voltage generator 320 may control the output time of the highest gamma reference voltage and the lowest gamma reference voltage to be different from each other depending on the logic value on the pin PN in at least one of the power-on period, the power-off period, the abnormal driving period, and the low power driving period (or the low power mode). The gamma reference voltages output from the gamma voltage generator 320 may be divided into the grayscale voltages for the respective grayscales by a voltage divider circuit utilizing a plurality of resistors connected in series, and may be supplied to the DAC 116. The DAC 116 selects a grayscale voltage corresponding to a grayscale of pixel data input from the second latch array 115 from among the grayscale voltages input from the gamma voltage generator 320 and outputs the selected grayscale voltage as the data voltage of the pixel data. The data voltage may be output through the output buffer 117 and supplied to the data line 102 of the display panel 100. The high potential voltage VDD may be applied to a VDD node of the output buffer 117, and the low potential voltage VSS or a ground voltage may be applied to a VSS node.

The output multiplexer 310 may output the data voltage of the pixel data output through the output buffer 117 regardless of the logic value on the pin PN during a normal driving period in which the pixel data of the input image is input to the receiver of the source driver SIC. The output multiplexer 310 may output the separate high potential voltage VDD or the separated low-potential voltage VSS as the black grayscale voltage that is separated from the data voltage channel depending on the logic value on the pin PN, under the control of the logic controller 300. For example, the output multiplexer 310 may output the high potential voltage VDD when the logic value on the pin PN is Low and the low potential voltage VSS when the logic value on the pin PN is High in any one of the power-on period, the power-off period, the abnormal driving period, and the low power driving period (or low power mode). Accordingly, the output multiplexer 310 may select and output any one of the data voltage from the output buffer 117, the high potential voltage VDD, and the low potential voltage VSS as the output voltage Yn.

Figure 4:
FIG. 4 is a diagram schematically illustrating a pin of a source driver.

FIG. 4 is a diagram schematically illustrating the pin PN of the source driver SIC.

The display device may include a circuit board (PCB) and a chip on film (COF) that are electrically connected to the display panel 100. The source driver SIC in which the circuit of the data driver 110 is integrated may be mounted on a flexible film of the COF. The source driver SIC may be mounted directly on the substrate of the display panel 100 in a chip on glass (COG) process or a chip on plastic (COP) process.

The source driver SIC may include the pin PN that directs the driving characteristics of the display panel 100. The pin PN may be a single lead protruding outward from any one of the four sides of an IC chip package of the source driver SIC, or a single pad or single bump exposed on the bottom surface of the IC chip package.

The pins PN of the source driver SIC may be exposed outside the IC chip of the source driver SIC for connection to any one of the power wire formed on the circuit board PCB and the flexible film of the COF and the power wire formed on the display panel 100. The black grayscale voltage output from the source driver SIC may vary depending on the voltage applied to the pin PN, i.e., the logic value on the pin PN. As shown in FIG. 4, the logic value on the pin PN may be Low when a first voltage, e.g., the low potential voltage VSS, is applied to the pin PN of the source driver SIC. When a second voltage, e.g., the IC power voltage VCC is applied to the pin PN of the source driver SIC, the logic value on the pin PN may be High, but is not limited thereto. The IC power voltage VCC and the low potential voltage VSS may be connected to the pin PN through a resistor.

Figure 5:
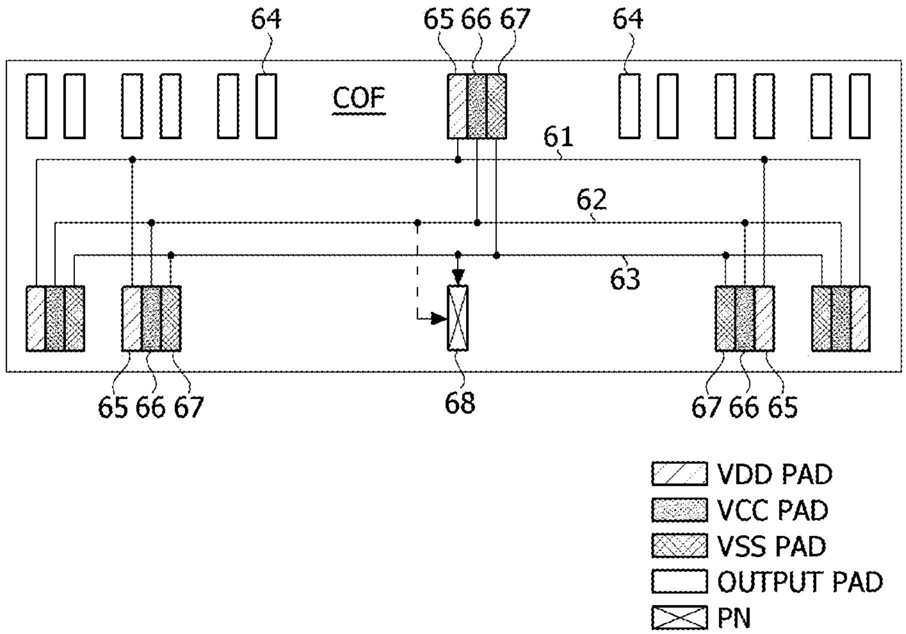
FIG. 5 is a diagram illustrating power wires and pads of a COF according to one aspect of the present disclosure.

FIG. 5 is a diagram illustrating the power wires of the COF according to one aspect of the present disclosure.

Referring to FIG. 5, the COF on which the source driver SIC is mounted includes power wires 61, 62, and 63. A first power wire 61 is connected to one or more VDD pads 65. A second power wire 62 is connected to a VCC pad 66. A third power wire 63 is connected to a VSS pad 67. The COF includes a plurality of input pads through which the input data is received, and a plurality of output pads 64 through which the output voltage Yn is output. In FIG. 5, the input pads are omitted. The COF further includes a pin pad 68. The pin pad 68 may be connected to the second power wire 62 or the third power wire 63. The logic value on the pin PN may be determined by the voltage level applied to the pin pad 68.

Figure 6:
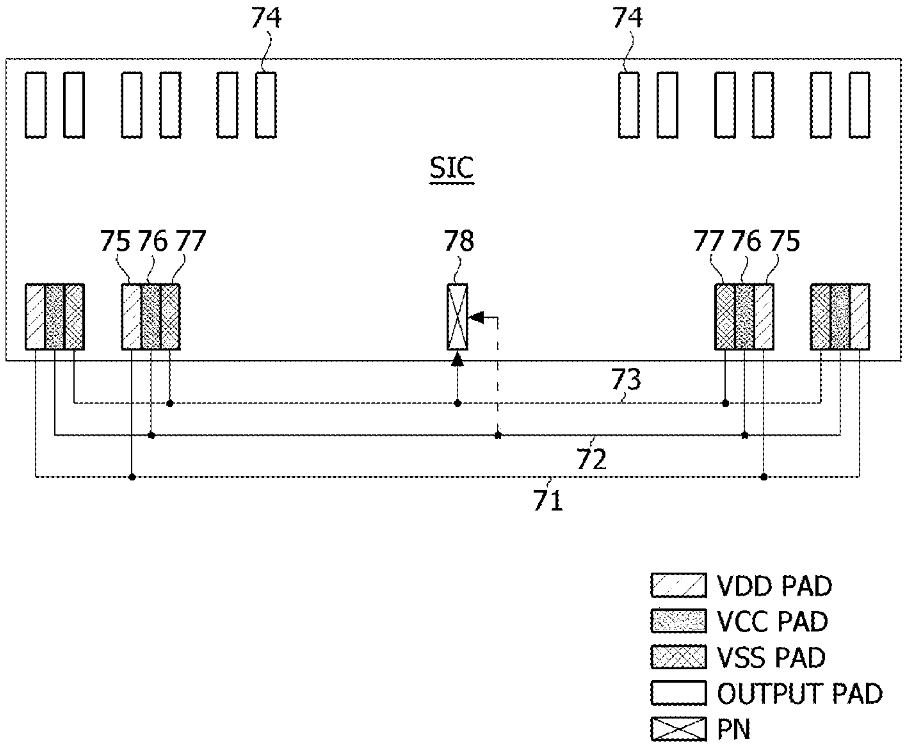
FIG. 6 is a diagram illustrating power wires of a display panel connected to a source driver according to one aspect of the present disclosure.

FIG. 6 is a diagram illustrating the power wires of the display panel connected to the source driver according to one aspect of the present disclosure.

Referring to FIG. 6, the source driver SIC may be mounted directly on the substrate of the display panel 100 in a chip on glass (COG) process or a chip on plastic (COP) process. This source driver SIC includes a plurality of pads 74, 75, 76, and 77 that are electrically connected to power wire 71, 72, and 73 disposed on the substrate of the display panel 100. A first power wire 71 is connected to one or more VDD pads 75 formed on the bottom surface of the source driver SIC. A second power wire 72 is connected to a VCC pad 76 formed on the bottom surface of the source driver SIC. A third power wire 73 is connected to a VSS pad 77 formed on the bottom surface of the source driver SIC. Output pads 74 of the source driver SIC may be electrically connected to the data lines of the display panel 100. In FIG. 6, input pads are omitted. The source driver SIC further includes a pin pad 78. The pin PN may be connected to the second power wire 72 or the third power wire 73 to determine its logic value. The pin pad 78 may be connected to the second power wire 72 or the third power wire 73. The logic value of the pin PN may be determined by the voltage level applied to the pin pad 78.

Figure 7:
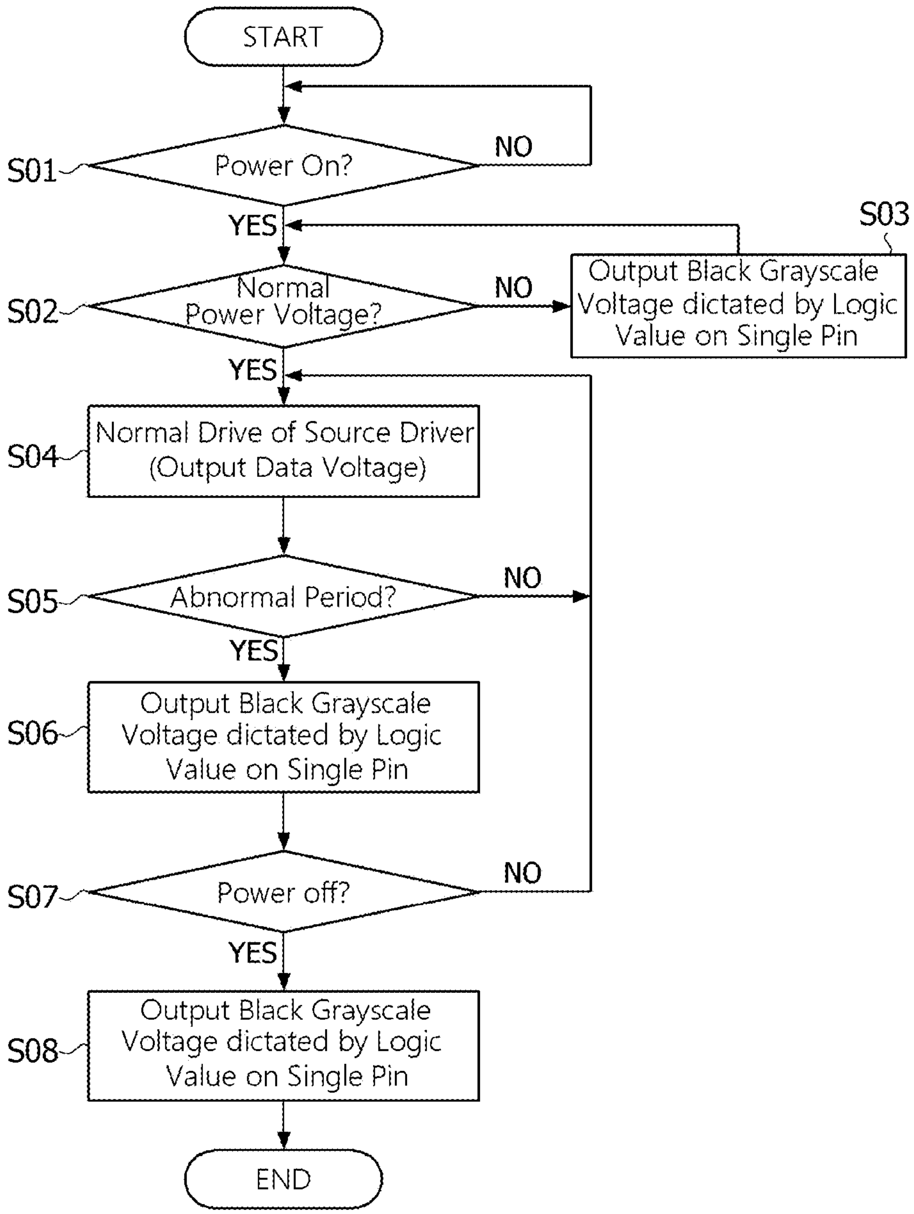
FIG. 7 is a flowchart illustrating a method of controlling a source driver according to one aspect of the present disclosure.

FIG. 7 is a flowchart illustrating a method of controlling the source driver according to one aspect of the present disclosure. This control method may be controlled by the logic controller 300 electrically connected to the pin PN.

Referring to FIG. 7, the source driver SIC may determine whether each of the IC power voltage VCC and the high potential voltage VDD is at a voltage level of the normal power voltage during the power-on period in which the power voltages VCC and VDD begin to be input (S01 and S02). The source driver SIC may determine that a period of time from a time when the high potential voltage VDD rises above the reference value to a time delayed by a predetermined amount of time is the power-on period by comparing the voltage level of the high potential voltage VDD to a reference value, or may determine a power-on state by reading a data code indicating the power-on period from the data received from the timing controller 130.

Because the data received by the source driver SIC during the power-on period is garbage data, the source driver SIC ignores and does not sample the data received during the power-on period.

During the power-on period, the source driver SIC outputs a black grayscale voltage dictated by the logic value on the pin PN to prevent an abnormal image from being visible on the display panel 100 (S03). For example, the source driver SIC may output a black grayscale voltage as the high potential voltage VDD dictated by the first logic value on the pin PN as described above. On the other hand, the source driver SIC may output a black grayscale voltage as the low potential voltage VSS dictated by the second logic value on the pin PN.

After the power-on period, when the power voltages VCC and VDD are stabilized to the voltage level of the normal power, the normal driving period begins. Data received by the source driver SIC during the normal driving period includes valid pixel data to be written to the pixels of the display panel 100 and visually reproduced. The source driver SIC converts the pixel data of the received input video to the grayscale voltage during the normal driving period and outputs the data voltage (S04).

The source driver SIC may be driven as an abnormal driving period when at least one of static electricity, over-current, and overvoltage is detected by real-time detection of the power voltage, such as the high potential voltage VDD, or when the IC power voltage VCC is discharged earlier than the high potential voltage VDD within the power-off period. The source driver SIC may output a black grayscale voltage dictated by the logic value on the pin PN during the abnormal driving period to prevent an abnormal image from being visible on the display panel 100 (S05 and S06).

The source driver SIC may output a black grayscale voltage dictated by the logic value on the pin PN during the power-off period in which the power voltages VCC and VDD are turned off, to prevent an abnormal image from being visible on the display panel 100. The source driver SIC may compare the voltage level of the high potential voltage VDD to a reference value and determine that a period of time from a time when the voltage level of the high potential voltage VDD becomes lower than the reference value to a time delayed by a predetermined amount of time is the power-off period. The source driver SIC may output the black grayscale voltage dictated by the logic value on the pin PN when the power-off period occurs, and then stop its driving. During the power-off period, the IC power voltage VCC applied to the source driver SIC may be delayed and then discharged.

Figure 9:
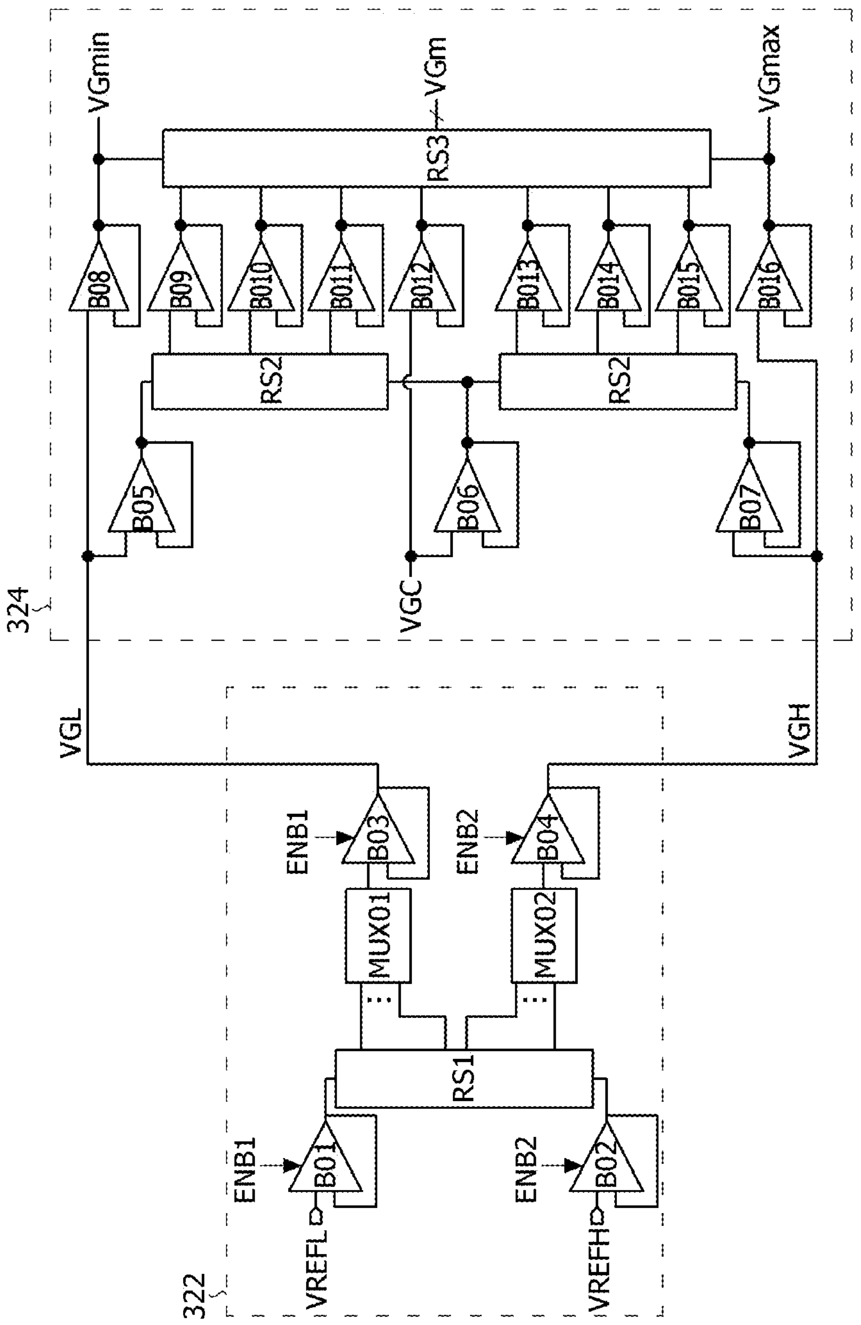

FIGS. 8 and 9 are circuit diagrams illustrating the gamma voltage generator and the output multiplexer in detail according to one aspect of the present disclosure. FIG. 10 is a diagram illustrating the operation of the output multi-plexer.

Referring to FIGS. 8 and 9, the logic controller 300 may include a first controller 302 for controlling the output multiplexer 310 based on the logic value on the pin PN, and a second controller 304 for controlling the gamma voltage generator 320 based on the logic value on the pin PN.

The output multiplexer 310 includes a first switch element 311 connected between the output buffer 117 and an output terminal of the source driver SIC, and a multiplexer 312 that selects the high potential voltage VDD and the low potential voltage VSS. The multiplexer 312 may include a second switch element connected between the VDD node and an output terminal of the source driver SIC, and a third switch element connected between the VSS node and the output terminal of the source driver SIC. The high potential voltage VDD is applied to the VDD node, and the low potential voltage VSS is applied to the VSS node. Each of the switch elements in the output multiplexer 310 may be implemented as a transistor.

The high potential voltage VDD applied to the VDD node may be interpreted as the first black grayscale voltage, and the low potential voltage VSS applied to the VSS node may be interpreted as the second black grayscale voltage. For example, the source driver may select one of the first and second black grayscale voltages having different voltage levels depending on the voltage level on the pin PN, and output the selected black grayscale voltage.

The output buffer 117 outputs a data voltage Vdata of the pixel data output from the DAC 116 to the first switch element 311. The first switch element 311 is turned on in response to a first switch enable signal CHMUX from the first controller 302 and outputs the data voltage Vdata to the output terminal. The second switch element in the multi-plexer 312 is turned on in response to a second switch enable signal VDDEN to output the high potential voltage VDD to the output terminal, and the third switch element is turned on in response to a third switch enable signal VSSEN to output the low potential voltage VSS to the output terminal. Each of the switch elements may be turned off in response to a first logic value (OFF) of the switch enable signals CHMUX, VDDEN, and VSSEN and turned on in response to a second logic value (ON) of the switch enable signals CHMUX, VDDEN, and VSSEN.

During the normal driving period, regardless of the logic value (L or H) on the pin PN, the first controller 302 generates the first switch enable signal CHMUX as the second logic value (ON), while generating the second and third switch enable signals VDDEN and VSSEN as the first logic value (OFF), such that the data voltage Vdata of the pixel data is output from the source driver SIC during the normal driving period. As shown in FIG. 10, the first controller 302 generates any one of the second and third switch enable signals VDDEN and VSSEN as the second logic value (ON), while generating the first switch enable signal CHMUX as the first logic value (OFF), depending on the logic value on the pin PN, such that the black grayscale voltage is output from the source driver SIC during at least one of the power-on period, the power-off period, the low power driving period (or the low power mode), and the abnormal driving period.

For example, the first controller 302 outputs the second switch enable signal VDDEN as the second logic value (ON) and outputs the first and third switch enable signals CHMUX and VSSEN as the first logic values (OFF) in response to the first logic value (L) on the pin PN during at least one of the power-on period, the power-off period, the low-power driving period (or low-power mode), and the abnormal driving period. The second controller 302 outputs the third switch enable signal VSSEN as the second logic value (ON) and the first and second switch enable signals CHMUX and VDDEN as the first logic value (OFF) in response to the second logic value (H) on the pin PN during at least one of the power-on period, the power-off period, the low-power driving period (or low-power mode), and the abnormal driving period. Accordingly, when driving the data lines of the first type of panel, the source driver SIC outputs the high potential voltage VDD as the black grayscale voltage regardless of the pixel data of the input image during at least one of the power-on period, the power-off period, the low-power driving period (or low-power mode), and the abnormal driving period. When driving the data lines of the second type of panel, the source driver SIC outputs the low potential voltage VSS as the black grayscale voltage regardless of the pixel data of the input image during at least one of the power-on period, the power-off period, the low power driving period (or low power mode), and the abnormal driving period.

The gamma voltage generator 320 may include a first circuit part 322 and a second circuit part 324, as shown in FIGS. 8 and 9. The first circuit part 322 outputs the highest reference voltage VGH and the lowest reference voltage VGL. The first circuit part 322 may be interpreted as a master gamma circuit. The second circuit part 324 outputs gamma reference voltages having different voltage levels in a voltage range higher than a first input voltage VREFL and lower than a second input voltage VREFH. The second circuit part 324 may be interpreted as a slave gamma circuit.

The highest reference voltage VGH has the highest voltage level among the grayscale voltages input to the DAC 116 of the source driver SIC. The highest reference voltage VGH is the black grayscale voltage when the source driver is connected to the first type of panel and the white grayscale voltage when the source driver is connected to the second type of panel. On the other hand, the lowest reference voltage VGL is the white grayscale voltage when the source driver is connected to the first type of panel and the black grayscale voltage when the source driver is connected to the second type of panel.

The first circuit part 322 includes a first voltage divider RS1, a first voltage selector MUX01, a second voltage selector MUX02, and a first to a fourth buffers B01 to B04. The buffers B01 to B04 may be voltage followers. Each of the first and third buffers B01 and B03 may be driven while a first buffer enable signal ENB1 is input, passing the input voltage to the output stage. Each of the second and fourth buffers B02 and B04 may be driven while a second buffer enable signal ENB2 is input, passing the input voltage to the output stage. The voltage selectors MUX01 and MUX02 may be implemented as multiplexers that select and output one of a plurality of inputs dictated by a register setting value.

The first buffer B01 applies the first input voltage VREFL to one end of the first voltage divider RS1. The second buffer B02 applies the second input voltage VREFH to the other end of the first voltage divider RS1.

The first voltage divider RS1 may include resistors connected in series. The first voltage divider RS1 outputs voltages having different voltage levels in the voltage range higher than the first input voltage VREFL and lower than the second input voltage VREFH by means of voltage division nodes between the resistors. The first voltage selector MUX01 selects a voltage dictated by a first register setting value from among the first input voltage VREFL and a plurality of lower voltages and outputs the selected voltage to the third buffer B03. The third buffer B03 provides the voltage input from the first voltage selector MUX01 to the second circuit part 324 as the lowest reference voltage VGL. The second voltage selector MUX02 selects a voltage dictated by a second register setting value among from the second input voltage VREFH and a plurality of higher voltages and outputs the selected voltage to the fourth buffer B04. The fourth buffer B04 provides the voltage input from the second voltage selector MUX02 to the second circuit part 324 as the highest reference voltage VGH. The voltage level of the highest reference voltage VGL and the lowest reference voltage VGH output from the first circuit part 322 may each be adjusted depending on the first and second register setting values.

The second controller 304 simultaneously outputs the first and second buffer enable signals ENB1 and ENB2 as the second logic value (ON) to ensure that the buffers B01 to B02 of the first circuit part 322 are simultaneously driven during the normal driving period. In contrast, the second controller 304 may control the output time of the first and second buffer enable signals ENB1 and ENB2 differently to ensure that there is a difference between the driving time of the buffer that outputs the black grayscale voltage and the driving time of the buffer that outputs the white grayscale voltage during at least one of the power-on period, the power-off period, the low power driving period (or low-power mode), and the abnormal driving period. For example, the second controller 304 may control the enable times of the black grayscale voltage and the white grayscale voltage output from the first circuit part 322 by outputting the first and second buffer enable signals ENB1 and ENB2 in the manner shown in FIGS. 11A and 11B.

The second circuit part 324 may include second and third voltage divider RS2 and RS3, and fifth to sixteenth buffers B05 to B16. The buffers B05 to B16 may be voltage followers that are driven when the enable signal is input.

A fifth buffer B05 applies the lowest reference voltage VGL input from the first circuit part 322 to one end of the second voltage divider RS2. A sixth buffer B06 applies a medium reference voltage VGC input from the power supply to a middle voltage division node of the second voltage divider RS2. A seventh buffer B07 applies the highest reference voltage VGH input from the first circuit part 322 to the other end of the second voltage distribution part RS2. The second voltage divider RS2 may include resistors connected in series. The second voltage divider RS2 outputs voltages having different voltage levels in a voltage range higher than the lowest reference voltage VGL and lower than the highest reference voltage VGH by means of voltage division nodes between the resistors.

An eighth buffer B08 outputs the lowest reference voltage VGL input from the first circuit part 322 to the DAC 116. An output voltage VGmin from the eighth buffer B08 is a grayscale voltage having a minimum voltage level. A sixteenth buffer B16 outputs the highest reference voltage VGH input from the first circuit part 322 to the DAC 116. An output voltage VGmax of the sixteenth buffer B16 is a grayscale voltage having a maximum voltage level. Ninth to eleventh buffers B09, B10, and B11 are connected to lower voltage division nodes of the second voltage divider RS2 and apply lower voltages having different voltage levels in a voltage range higher than the lowest reference voltage VGL and lower than the medium reference voltage VGC to lower voltage division nodes between lower resistors of the third voltage divider RS3. A twelfth buffer B12 applies the medium reference voltage VGC to a middle voltage division node of the third voltage divider RS3. Thirteenth to fifteenth buffers B13, B14, and B15 are connected to higher voltage division nodes of the second voltage divider RS2 and apply higher voltages having different voltage levels in a voltage range higher than the medium reference voltage VGC and lower than the highest reference voltage VGH to the voltage division nodes between higher resistors of the third voltage divider RS3.

The third voltage divider RS3 may include resistors connected in series between the voltage division nodes to which the output voltages of the buffers B08 to B16 are applied. The third voltage divider RS3 outputs medium grayscale voltages VGm having different voltage levels by means of the voltage division nodes between the resistors. The medium grayscale voltages VGm output through the third voltage divider RS3 are input to the DAC 116. The DAC 116 selects a grayscale voltage corresponding to the grayscale value of the pixel data input as a digital signal from among the grayscale voltages VGmin, VGm, and VGmax input from the gamma voltage generator 320 and outputs it to the output buffer 117.

In FIG. 9, the output voltage VGmax from the sixteenth buffer B16 is the black grayscale voltage in the first type of panel and the white grayscale voltage in the second type of panel. On the other hand, the output voltage VGmin from the eighth buffer B08 is the white grayscale voltage in the first type of panel and the black grayscale voltage in the second type of panel.

Figure 11B:
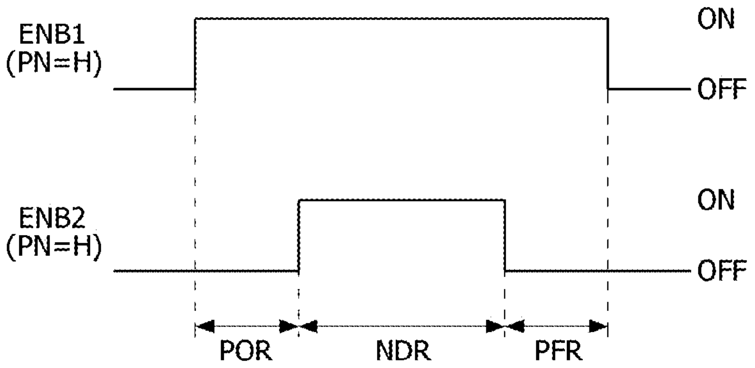

FIGS. 11A and 11B are diagrams illustrating a method of controlling a buffer in the gamma voltage generator according to one aspect of the present disclosure.

Referring to FIGS. 11A and 11B, the second controller 304 may control the enable time of the black grayscale voltage and the white grayscale voltage output from the first circuit part 322 of the gamma voltage generator 320 using the first and second buffer enable signals ENB1 and ENB2.

The second controller 304 controls the buffers of the gamma voltage generator 320 to ensure that no abnormal images are visible during the power-on period POR and the power-off period PFR. For example, the second controller 304 controls the buffer that outputs the white grayscale voltage to be in an off state during the power-on period POR and turns on the buffer that outputs the black grayscale voltage to prevent an abnormal image from being visible during the POR. During the normal operating period NOR in which the data voltage Vdata of the pixel data is output from the source driver SIC, the second controller 304 drives the buffer that outputs the black grayscale voltage and the buffer that outputs the white grayscale voltage without a time difference. The second controller 304 prevents an abnormal image from being visible during the power-off period PFR by turning off the buffer that outputs the white gradient voltage to ensure that no white grayscale voltage is output and then turning off the buffer that outputs the black gradient voltage.

When the pin PN is at the first logic value (L), the second controller 304 generates the second buffer enable signal ENB2 as the second logic value ON during the power-on period POR as shown in FIG. 11A, and then inverts the first buffer enable signal ENB1 from the first logic value OFF to the second logic value ON when entering the normal drive period NDR. Accordingly, when the pin PN is at the first logic value L, the second buffer enable signal ENB2 may be toggled to the second logic value ON earlier than the first enable signal ENB1 during the power-on period POR in which the display device is powered up.

When the pin PN is at the first logic value (L), as shown in FIG. 11A, the second controller 304 may invert the first buffer enable signal ENB1 from the second logic value ON to the first logic value OFF when entering the power-off period PFR, and then may invert the second buffer enable signal ENB2 from the second logic value ON to the first logic value OFF. Accordingly, when the pin PN is at the first logic value (L), the first enable signal ENB1 may be toggled to the first logic value OFF earlier than the second buffer enable signal ENB2 in the power-off period PFR in which the display device is powered down.

When the logic value of pin PN is the first logic value (L), during the power-on period POR and the power-off period PFR, the second and fourth buffers B02 and B04 are driven, while the first and third buffers B01 and B03 are not driven, by the buffer enable signals ENB1 and ENB2 as shown in FIG. 11A. In this case, since the highest reference voltage VGH corresponding to the black grayscale voltage in the first type of panel is input to the DAC 116 and the white grayscale voltage is not input to the DAC 116 during the power-on period POR and the power-off period PFR, the black grayscale voltage may be output from the DAC 116.

During the normal driving period, NDR, the second controller 304 maintains the buffer enable signals ENB1 and ENB2 at the second logic value (ON) regardless of the logic value on the single pin PN. Accordingly, the black grayscale voltage and the white grayscale voltage may be applied to the DAC 116 during the normal driving period NDR.

When the pin PN is at the second logic value (H), as shown in FIG. 11B, the second controller 304 generates the first buffer enable signal ENB1 as the second logic value ON during the power-on period POR, and then inverts the second buffer enable signal ENB2 from the first logic value OFF to the second logic value ON when entering the normal driving period NDR. Accordingly, when the pin PN is at the second logic value (H), the first buffer enable signal ENB1 may be toggled to the second logic value ON earlier than the second enable signal ENB2.

When the pin PN is at the second logic value (H), as shown in FIG. 11B, the second controller 304 may invert the second buffer enable signal ENB2 from the second logic value ON to the first logic value OFF when entering the power-off period PFR, and then may invert the first buffer enable signal ENB1 from the second logic value ON to the first logic value OFF. Accordingly, when the pin PN is at the second logic value (H), the second enable signal ENB2 may be generated to the first logic value OFF earlier than the first buffer enable signal ENB1.

When the logic value on the pin PN is the second logic value (H), during the power-on period POR and power-off period PFR, the first and third buffers B01 and B03 are driven, while the second and fourth buffers B02 and B04 are not driven, by the buffer enable signals ENB1 and ENB2 as shown in FIG. 11B. In this case, during the power-on period POR and the power-off period PFR, since the lowest reference voltage VGL corresponding to the black grayscale voltage in the second type of panel is input to the DAC 116 and the white grayscale voltage is not input to the DAC 116, the black grayscale voltage may be output from the DAC 116.

Figure 12:
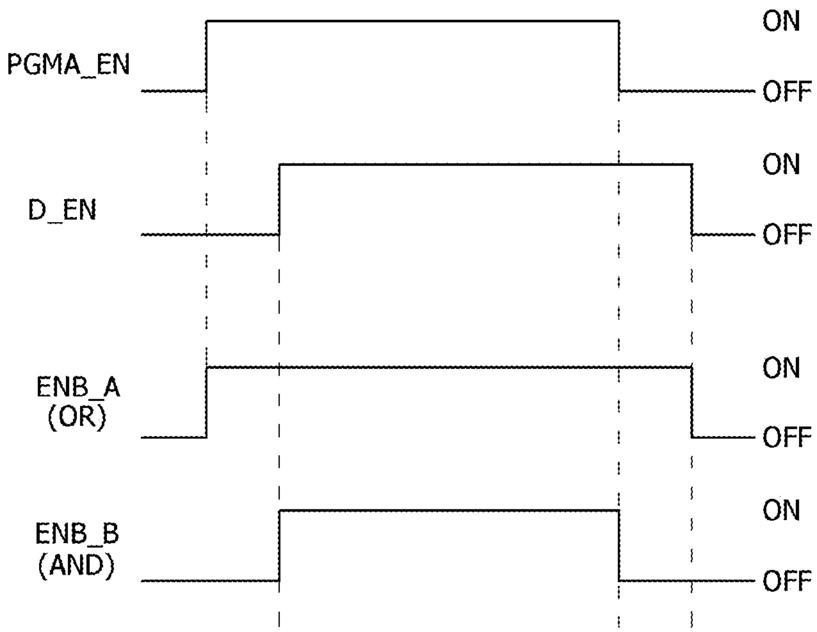
FIG. 12 is a waveform diagram illustrating an example of a method of generating the buffer enable signal shown in FIGS. 11A and 11B.

FIG. 12 is a waveform diagram illustrating an example of a method of generating the buffer enable signal shown in FIGS. 11A and 11B.

Referring to FIG. 12, the second controller 304 may generate the first and second buffer enable signals ENB1 and ENB2 based on a gamma enable signal PGMA_EN for driving the gamma voltage generator 320.

The second controller 304 may delay the gamma enable signal PGMA_EN by a predetermined period of time to generate a delayed enable signal D_EN. The second controller 304 generates enable signals ENB_A, ENB_B as the results of the logical sum (OR) operation and the logical product (AND) operation for the gamma enable signal PGMA_EN and the delayed enable signal D_EN. ENB_A is the second buffer enable signal ENB2 shown in FIG. 11A, and ENB_B is the first buffer enable signal ENB1 shown in FIG. 11B. ENB_B is the first buffer enable signal ENB1 shown in FIG. 11A, and the second buffer enable signal ENB2 shown in FIG. 11B.

Figure 13:
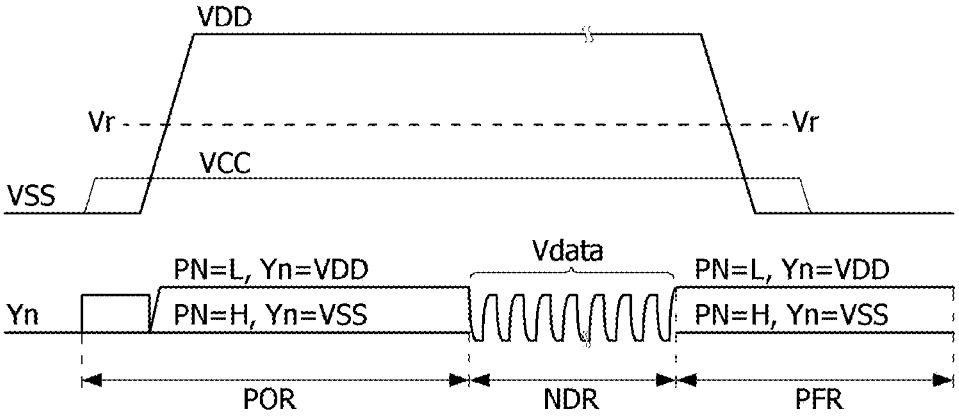
FIGS. 13 and 14 are diagrams illustrating the constant voltage input to the source driver and the output voltage from the source driver during a power-on period, a normal driving period, and a power-off period.
Figure 14:
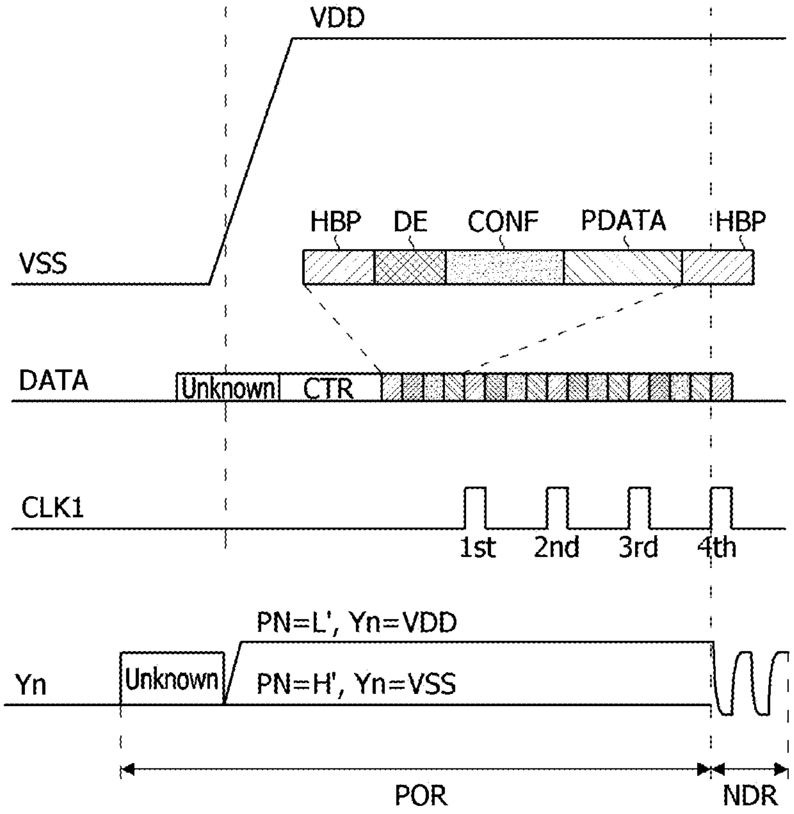

FIGS. 13 and 14 are diagrams illustrating the constant voltage input to the source driver and the output voltage from the source driver during the power-on period, the normal driving period, and the power-off period. In FIG. 13, 'Yn' denotes the output voltage from the source driver SIC.

The source driver SIC may compare the high potential voltage VDD to a predetermined reference value to determine the power-on period POR and the power-off period PFR. For example, the source driver SIC may determine that the power-on period POR is a period of time until the high potential voltage VDD becomes higher than the reference voltage Vr by starting to drive after receiving the IC supply voltage VCC, the high potential voltage VDD reaches the target voltage, and then a predetermined time elapses. The power-off period PFR may be determined as a period of time until the high potential voltage VDD starts to decrease from the target voltage and becomes lower than the reference voltage Vr, and then the IC power voltage VCC is discharged to the low potential voltage VSS.

The source driver SIC may determine the power-on state by reading a data code dictating the power-on period from the data received from the timing controller 130. The timing controller 130 may transmit digital signals to the source driver SIC in the following sequence: a clock training signal CTR, a data enable signal DE, a configuration data packet CONF, and a pixel data packet PDATA at each horizontal period, as shown in FIG. 14. These data may be transmitted as differential signals. In FIG. 14, "HBP" denotes horizontal blank data to separate one horizontal period.

The clock training signal CTR is an alternating current signal that is toggled at a constant frequency so that the output phase of the built-in clock generator of the source driver SIC may be locked. The data enable signal DE is added to data every one horizontal period to separate a one pixel line of data. The configuration data packet CONF may include control data defining various functions of the source driver SIC and dictating a driving mode. The configuration data packet CONF may include data that dictates the power-on period, data that dictates the low-power driving mode, and so on. The pixel data packet PDATA include a one pixel line of pixel data in the display panel. The source driver SIC determines that data received before the normal driving period NDR is garbage data, and determines that data received during the NDR is valid pixel data that is written to the pixels. In FIGS. 13 and 14, "Unknown" represents the garbage data that exists before the source driver SIC outputs the black grayscale voltage dictated by the logic value on the pin PN.

The configuration data packet CONF received by the source driver SIC during the power-on period POR may include data that dictates the power-on period. During the power-on period POR, the source driver SIC counts the data dictating the power-on period as clock CLK1 and may enter the normal-driving period NDR at the fourth clock, but is not limited thereto.

The present disclosure and effects of the present disclosure described above do not specify essential features of the claims, and thus, the scope of the claims is not limited to the disclosure of the present disclosure.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Thus, it is intended that the present disclosure covers the modifications and variations of the aspects provided they come within the scope of the appended claims and their equivalents.

What is claimed is:

1. A source driver comprising:

a pin to which a first voltage or a second voltage is applied;

an output multiplexer configured to select a data voltage of pixel data and a black grayscale voltage; and a controller configured to control the voltage level of the black grayscale voltage differently depending on the first voltage or the second voltage applied to the pin, wherein the black grayscale voltage is higher than a white grayscale voltage when the voltage on the pin is the first voltage.

2. The source driver of claim 1, wherein the black-grayscale voltage is lower than the white-grayscale voltage when the voltage on the pin is the second voltage.

3. The source driver of claim 1, further comprising:

a digital-to-analog converter configured to convert an input digital signal to a grayscale voltage;

a gamma voltage generator configured to supply the grayscale voltage to the digital-to-analog converter; and an output buffer connected to an output terminal of the digital-to-analog converter.

4. The source driver of claim 3, wherein the output multiplexer is configured to select one of an output voltage from the output buffer, a high potential voltage, and a low potential voltage lower than the high potential voltage under the control of the controller and output it.

5. The source driver of claim 4, wherein the output multiplexer is configured to select and output the output voltage of the output buffer to an output terminal of the source driver during a normal driving period in which the pixel data of an input image is received.

6. The source driver of claim 5, wherein the output multiplexer is configured to select and output the high potential voltage to the output terminal of the source driver when the voltage on the pin is the first voltage in at least one of a power-on period, a power-off period, an abnormal driving period, and a low power driving period.

7. The source driver of claim 6, wherein the output multiplexer is configured to select and output the low potential voltage to the output terminal of the source driver when the voltage on the pin is the second voltage in at least one of the power-on period, the power-off period, the abnormal driving period, and the low power driving period.

8. The source driver of claim 4, further comprising a logic controller configured to control at least one of the output multiplexer and the gamma voltage generator depending on a logic value determined according to a voltage applied to the pin.

9. The source driver of claim 8, wherein the output multiplexer includes:

a first switch element configured to be connected between the output buffer and the output terminal; and a multiplexer configured to select the high potential voltage and the low potential voltage.

10. The source driver of claim 9, wherein the multiplexer includes:

a second switch element connected between a VDD node and the output terminal; and a third switch element connected between a VSS node and the output terminal.

11. The source driver of claim 10, wherein the high potential voltage is applied to the VDD node, and the low potential voltage is applied to the VSS node.

12. The source driver of claim 3, wherein the gamma voltage generator includes:

a first buffer configured to output a lowest reference voltage; and a second buffer configured to output a highest reference voltage, wherein the second buffer is turned on and the first buffer is in the off state when the voltage on the pin is the first voltage during the power-on period.

13. The source driver of claim 12, wherein the first buffer is turned on and the second buffer is in the off state when the voltage on the pin is the second voltage during the power-on period.

14. The source driver of claim 1, wherein the pin is connected to one of a power wire disposed on a printed circuit board, a power wire disposed on a film on which the source driver is mounted, and a power wire disposed on a display panel to which the source driver is electrically connected.

15. A method of controlling a source driver, comprising:

selecting one of first and second black grayscale voltages having different voltage levels depending on a voltage level on a pin; and outputting the selected black grayscale voltage, wherein the selected black grayscale voltage is higher than a white grayscale voltage when the voltage on the pin is a first voltage.

16. The method of claim 15, wherein the selected black-grayscale voltage is lower than the white-grayscale voltage when the voltage on the pin is a second voltage.

17. The method of claim 15, further comprising:

outputting a data voltage of pixel data regardless of the voltage level on the pin during a normal operating period in which the pixel data of an input image is received; and outputting the selected black grayscale voltage in at least one of a power-on period, a power-off period, an abnormal driving period, and a low power driving period.

18. The method of claim 17, wherein an output voltage level of the source driver is selected during the power-on period and the power-off period according to a voltage applied to the pin.

* * * * *